Figure 1:
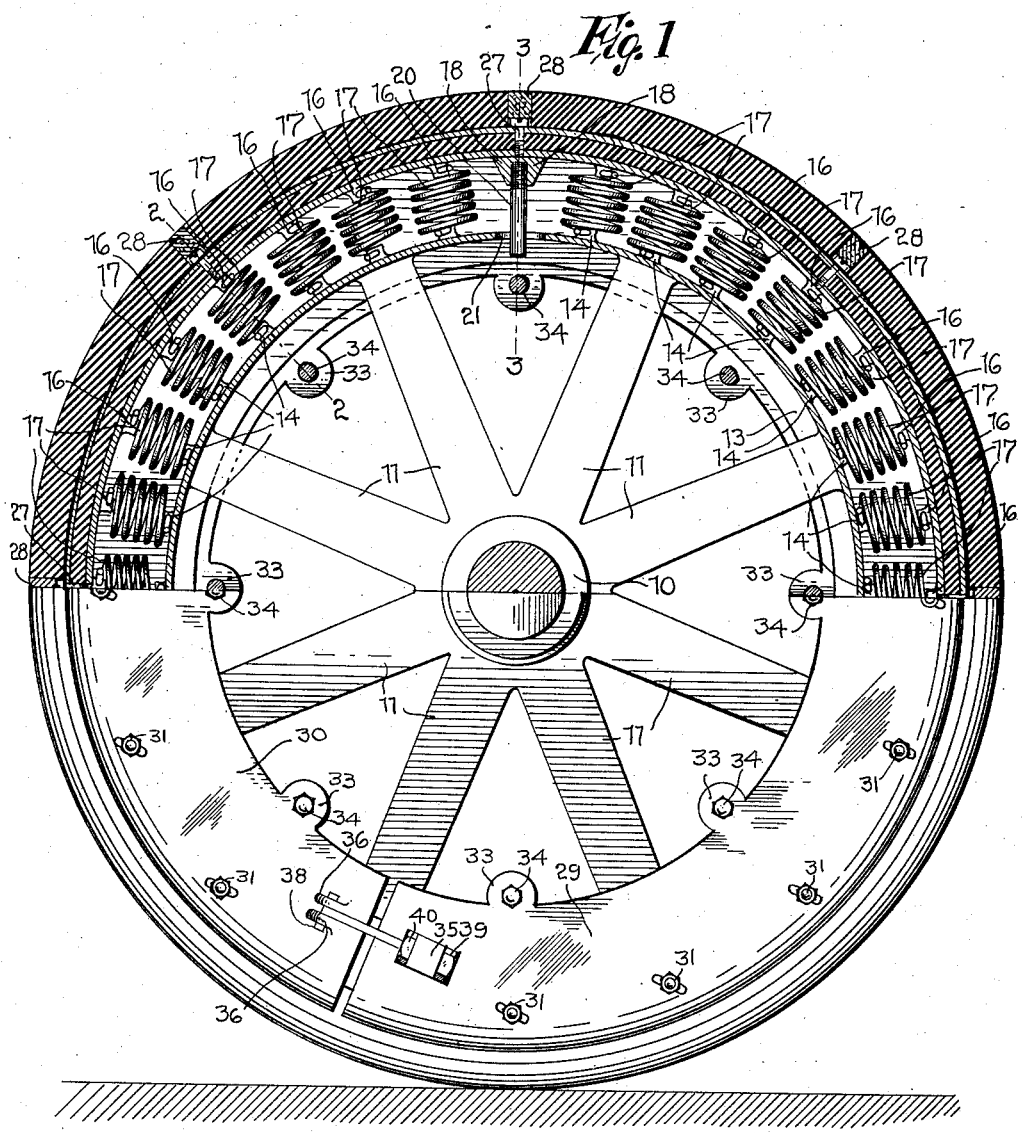

L. C. BEAUMONT.
AUTOMOBILE TIRE.
APPLICATION FILED NOV. 13, 1911.

1,025,854.

Patented May 7, 1912.
2 SHEETS—SHEET 1.

WITNESSES
Robert M. Sutphend
Ross J. Woodward

INVENTOR
Leon C. Beaumont.
By E. E. Vrooman, his Attorney.

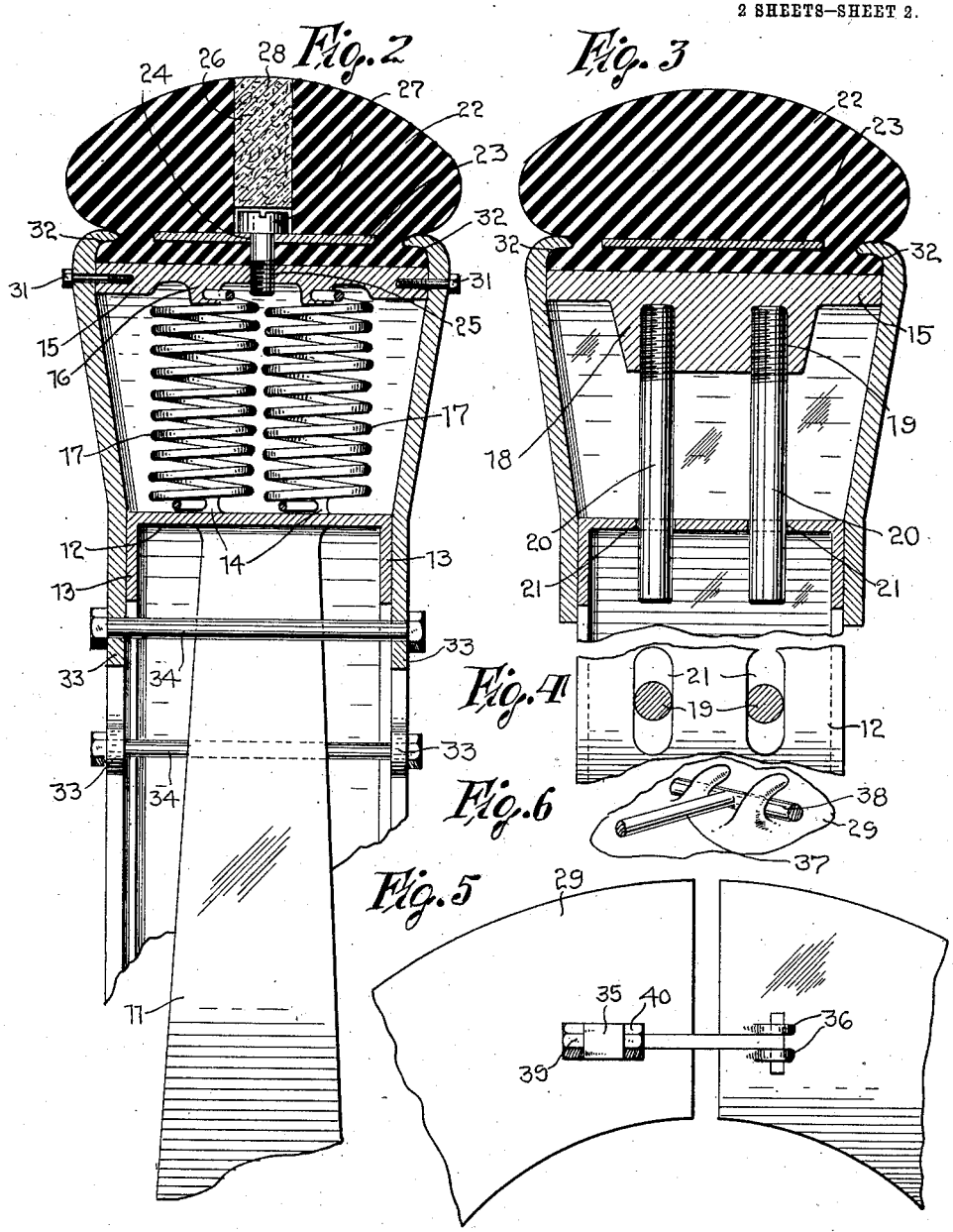

UNITED STATES PATENT OFFICE.

LEON CLIFFORD BEAUMONT, OF HUDSON FALLS, NEW YORK.

AUTOMOBILE-TIRE.

1,025,854.

Specification of Letters Patent.

Patented May 7, 1912.

Application filed November 13, 1911. Serial No. 660,011.

*To all whom it may concern:*

Be it known that I, LEON C. BEAUMONT, a citizen of the United States, residing at Hudson Falls, in the county of Washington and State of New York, have invented certain new and useful Improvements in Automobile-Tires, of which the following is a specification, reference being had therein to the accompanying drawing.

This invention relates to automobile wheels and the principal object of the same is to provide the wheel with a novel type of rim in which there is provided outer and inner rims which are held in spaced relation by springs, the springs being inclosed by side plates which hold the tire upon the outer rim and also limit the contraction of the springs. There is also provided a novel type of device for assisting in holding the tire upon the outer rim.

In the accompanying drawings like characters of reference indicate like parts in the several views, and Figure 1 is a side view of a wheel constructed in accordance with this invention, shown partly in side elevation and partly in section. Fig. 2 is a section along the line 2—2, Fig. 1. Fig. 3 is a section along the line 3—3, Fig. 1. Fig. 4 is a plan view looking at the inner face of the portion of the inner rim shown in Fig. 3. Fig. 5 is a fragmentary view showing the means for connecting the side plates together. Fig. 6 is a fragmentary view showing the manner of connecting the T-bar with one of the side plates.

Referring to the accompanying drawings by numerals, it will be seen that the invention comprises a hub 10 from which radiates the spokes 11, the spokes being connected with the inner rim 12 which is provided with side flanges 13. The inner rim is provided upon its outer surface with a number of sets of lugs 14, said lugs being arranged in pairs and each provided with a trans versely extending opening. The outer rim 15 is also provided with lugs 16 which are arranged in pairs and positioned in alinement with the lugs of the inner rim. Springs 17 are connected with the lugs 14 and 16 to hold the rims in spaced relation. It should be noted that the springs 17 when contracted are of less length than the space which is provided between the inner and outer rims, thus making it necessary to stretch the springs in order to mount them in the openings which are formed through the lugs, thus preventing any danger of the springs slipping out of place as the contraction of the springs holds them tightly in place. The outer rim is also provided with lugs 18, each of which is provided with the threaded openings 19 in which there are mounted the pins 20 which pass through openings 21 in the inner rim and act as guides.

The tire 22 has a metallic band 23 embedded adjacent its inner face and is provided with openings 24 formed in alinement with threaded openings 25 formed through the outer rim between the lugs of certain of the sets of springs. The tire is also provided with openings 26 so that securing screws 27 may pass through the opening formed through the band 23 and engage the threads of the openings 25, thus securing the tire to the outer rim. A filling 28 of any suitable material such for instance as cork or rubber is placed in the openings 26 after the screws are in place. Semicircular side plates 29 and 30 are placed to each side of the rims and are secured to the outer rim by means of bolts 31. The outer edges of the plates are turned to form flanges 32 which engage the tire and assist in holding the tire upon the outer rim. Perforated ears 33 extend inwardly from the side plates and are positioned between the spokes so that bolts 34 may pass between the spokes and through the openings formed through the ears, thus connecting the ears together and limiting the contraction of the springs. The plate 29 is provided with an eye 35 which is positioned in alinement with the claws 36 formed upon the plate 30. The T-bar 37 has its bridge 38 engaged by the claws 36 and passes through the eye 35. The nut 39 is turned to draw the side plates as close together as necessary and is then locked by means of the locking nut 40.

What is claimed is:—

A wheel comprising an inner rim, an outer rim, means holding said rims in spaced relation, side plates secured to said outer rim, each of said side plates comprising arcuate sections, one of said sections being provided with an outstanding eye, the other of said sections being provided with claws positioned in alinement with said eye, a T-bar engaging said claws and passing through said eye, and securing nuts mounted upon said T-bar.

In testimony whereof I hereunto affix my signature in presence of two witnesses.

LEON CLIFFORD BEAUMONT.

Witnesses:
 EDWARD V. BEAUMONT,
 ANNA H. RICHARDS.

Copies of this patent may be obtained for five cents each, by addressing the "Commissioner of Patents, Washington, D. C."